(12) United States Patent
Bell et al.

(10) Patent No.: US 11,055,724 B1
(45) Date of Patent: Jul. 6, 2021

(54) SYSTEM AND METHOD FOR CAMERA REGISTRATION

(71) Applicant: Numerex Corp., Atlanta, GA (US)

(72) Inventors: Joseph A. Bell, Plano, TX (US); Christian T. Patterson, Dallas, TX (US)

(73) Assignee: Numerex Corp., Atlanta, GA (US)

( * ) Notice: Subject to any disclaimer, the term of this patent is extended or adjusted under 35 U.S.C. 154(b) by 587 days.

(21) Appl. No.: 14/794,602

(22) Filed: Jul. 8, 2015

Related U.S. Application Data

(60) Provisional application No. 62/022,542, filed on Jul. 9, 2014.

(51) Int. Cl.
*G06F 21/44* (2013.01)
*G06Q 30/00* (2012.01)
*H04N 5/232* (2006.01)

(52) U.S. Cl.
CPC .......... *G06Q 30/012* (2013.01); *G06F 21/44* (2013.01); *H04N 5/23206* (2013.01)

(58) Field of Classification Search
CPC .................. G06Q 30/012; H04N 5/23206
USPC .......................................... 705/302; 709/220
See application file for complete search history.

(56) References Cited

U.S. PATENT DOCUMENTS

| | | | | |
|---|---|---|---|---|
| 8,799,992 B2* | 8/2014 | Marvais | ............... | H04L 41/0893 709/220 |
| 9,641,344 B1* | 5/2017 | Kim | ........................ | H04L 9/30 |
| 2007/0011301 A1* | 1/2007 | Ong | .................... | H04L 61/2015 709/224 |
| 2007/0192464 A1* | 8/2007 | Tullberg | ........... | H04L 29/12009 709/223 |
| 2010/0030875 A1* | 2/2010 | Visser | ................. | H04L 41/0806 709/220 |
| 2013/0073403 A1* | 3/2013 | Tuchman | ............... | H04W 8/265 705/16 |
| 2014/0365624 A1* | 12/2014 | Whittemore | ............ | H04L 67/34 709/221 |
| 2016/0127132 A1* | 5/2016 | Lee | ....................... | H04L 9/0819 713/156 |

OTHER PUBLICATIONS

Chukruvorty, R and Ottevunger, H, "Architecture and implementation of a remote management framework for dynamically reconfigurable devices", [online], 2002, p. 376, [retrieved on Jun. 6, 2018] Retrieved from the Internet: https://ieeexplore.ieee.org/stamp/stamp.jsp?tp=&arnumber=1033340.*

* cited by examiner

*Primary Examiner* — Lynda Jasmin
*Assistant Examiner* — Ehrin L Pratt
(74) *Attorney, Agent, or Firm* — King & Spalding

(57) ABSTRACT

A system and method for registration of a remote security camera is described. The system and method include receiving at a default server a message from the security camera upon initial boot up of the security camera, receiving at the default server a message from a customer server, the message requesting that the security camera be registered to a customer. Where the default server sends to the customer server reconfiguration information the reconfiguration information instructing the security camera to connect to the customer server.

5 Claims, 5 Drawing Sheets

SYSTEM AND METHOD FOR CAMERA REGISTRATION

CROSS REFERENCE TO RELATED INFORMATION

This application claims the benefit of U.S. Provisional Patent Application No. 62/022,542, filed Jul. 9, 2014, titled System and Method for Camera Registration, the contents of which are hereby incorporated herein in its entirety.

TECHNICAL FIELD

The present disclosure is directed to remote communications with security cameras, and more particularly to a system and method for registering security cameras with monitoring systems.

BACKGROUND OF THE INVENTION

Cameras are becoming ubiquitous in public areas. Both governments and private companies and citizens are using security cameras to capture and record activity in areas of interest. In past systems, the cameras were directly connected to a recording device on premises. The recording device was usually a video cassette recorder or, with the advent of digital cameras, a digital video recorder and hard drive. More recently, security cameras are being connected over the Internet to remote monitoring centers that can monitor thousands of cameras simultaneously. In addition to on site recording devices, these monitoring centers can access and record the video coming from the cameras in real time. As these cameras are not hard wired to recording devices any more, camera manufacturers have come up with a variety of mechanisms to set up the cameras in their initial deployment and to have the cameras connected to a wired or wireless network and the Internet so that they can communicate with the remote monitoring applications.

The data transmitted by the cameras may include images, sound, or a combination of images and sound. The data from the cameras may be transmitted to a monitoring center or some other centralized receiving unit, for example a headend. The headend may be a server associated with the monitoring center. The headend may allow for many cameras to be monitored or recorded at one location rather than a disjointed network of recording locations. The headend location may be at a location remote from the location of the cameras, preventing tampering with recordings by people at the location of the cameras. Some cameras may be connected to a headend using internet protocol (IP). In these cases, the cameras may have an assigned IP address to identify them to the headend. The cameras may also have some other identifier to identify them to the headend, for example a hostname or other human-friendly name that may be resolved into an IP address or other address routable over a network. The headend may use the camera identifier to identify where a particular data feed is originating. The headend may also use the camera identifier to send information to the camera. When a camera is connected to a network, it may not be programmed with a headend location to transmit data to. In some cases a technician may have to manually program each camera with a headend address for data transmission.

BRIEF SUMMARY OF THE INVENTION

In a preferred embodiment a method for registration of a remote security camera includes receiving at a default server a message from the security camera upon initial boot up of the security camera, and receiving at the default server a message from a customer server, the message requesting that the security camera be registered to a customer. The default server sends to the customer server reconfiguration information, the reconfiguration information instructing the security camera to connect to the customer server.

In another preferred embodiment a remote security camera includes memory storing configuration information, the configuration information including an IP address for a default server, a network interface the network interface operable to establish a network connection upon the security camera being powered up, the network interface operable to send a message from the security camera to the default server using the IP address for the default server stored in the memory, and a processor operable to receive configuration information from the default server using the network interface. The processor is operable to write the new configuration information to the memory, where the new configuration information includes the IP address of a customer server.

In yet another preferred embodiment, a system for registration of a remote security camera is described. The system includes a default server, operable to receive a message from the security camera upon initial boot up of the security camera. The system also includes a customer server, the customer server operable to send a message to the default server requesting that the security camera be registered to a customer. The default server is programmed to send to the customer server reconfiguration information, the reconfiguration information instructing the security camera to connect to the customer server.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1:
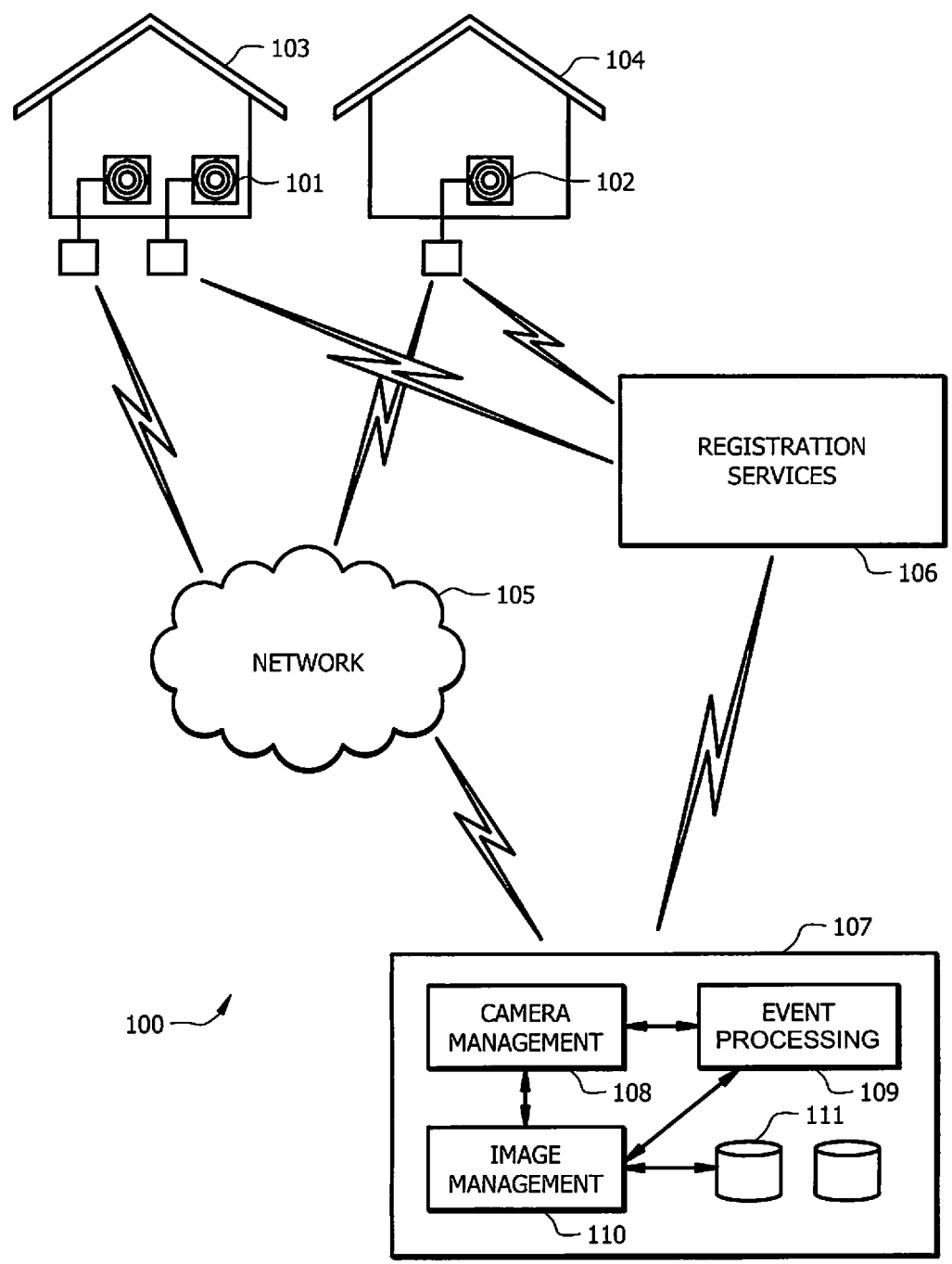
FIG. 1 is a network diagram of a preferred embodiment of a system to register a camera with a headend.

Described herein is a system and method for registering a camera with a headend. Referring now to FIG. 1, a preferred embodiment of a system for registering cameras is shown. System 100 includes cameras 101 and 102 at monitored sites 103 and 104. The cameras 101 and 102 may be in wired or wireless communication with a network at monitored sites 103 and 104, with that network in communication with the Internet or other network 105. The cameras 101 and 102 may also be directly connected to network 105 using other wired or wireless technologies such as cellular or radio. Because of the amount of data being transmitted from the cameras a wired or wifi network connection is preferred to cellular. As discussed below, the present teachings include descriptions and references to default, customer, and other 'headends.' The term 'headend' can be taken to refer to a server(s).

In a preferred embodiment, cameras 101 and 102 may be programmed with the address of a default headend prior to shipment to an installer. This default headend may be part of a registration service 106 provided by the manufacturer or service provider. The default headend may be in communication with a camera management system 107 that acts as a serving headend that is configured to provide video services to customers. Camera management system 107 includes a camera management function 108 that handles communications with the cameras, an event processing function 109 that is used by the camera management system to handle events involving the security camera, such as real time interaction with the camera during an alarm event, and an image management function 110 that manages the video streams received by the camera and stores the images and video in database 111.

When a new camera is installed and turned on for the first time, the camera may retrieve the preprogrammed address of the default headend and communicate with the default headend. Either before or after the installation and initial power-on of the camera, an installer may log into a user interface for communicating with the serving headend of the customer. From the serving headend, the installer may register the newly installed or soon to be installed camera. Upon registration of the camera, the serving headend may communicate with the default headend to claim the camera. If the requested camera is not already associated with a serving headend, the default headend may reconfigure the camera to communicate with the requesting serving headend. The default headend may then make an entry in a database indicating that the camera is now assigned to the requesting serving headend. Should the camera be reset to factory defaults and try to reconnect with the default headend, the default headend would check the database and automatically assign the camera to the serving headend that had previously requested the camera without needing a new request.

Each camera may have several attributes associated with it. The "customer id" attribute may be used to identify the customer that the camera is currently registered to. A camera with a non-nil customer id is considered to be in use. The "serving_headend_id" attribute may identify the headend that currently owns the camera. A camera with a non-nil serving_headend_id may be considered to be in use. The "default headend id" may identify the headend that the camera was claimed from. This attribute may remain set even if the camera is returned to the default headend so that the camera may be pointed back to that headend if it erroneously connects to a headend. Table 1 describes states that the camera may be in based upon the configuration of the attributes associated with the camera.

TABLE 1

| customer_id | serving_headend_id | default_headend_id | Description |
|---|---|---|---|
| nil | nil | nil | Unregistered camera. Eligible to be registered to a local customer or be claimed by another headend. |
| nil | nil | non-nil | Unregistered camera previously claimed from the default headend. Must be claimed from the default headend before being registered to a customer again. If the camera connects to a serving headend, it will be pointed back to the default headend. |
| nil | non-nil | nil | Camera claimed by and registered on the serving headend. If the camera connects to a default headend, it will be pointed back to the serving headend. |
| nil | non-nil | non-nil | INVALID - Treat as remotely registered. If the camera connects to a default headend, it will be pointed back to the serving headend. |
| non-nil | nil | nil | Registered camera. |
| non-nil | nil | non-nil | Registered camera that was claimed from the default headend. |
| non-nil | non-nil | nil | INVALID - Treat as registered. |
| non-nil | non-nil | non-nil | INVALID - Treat as registered. |

Figure 2:
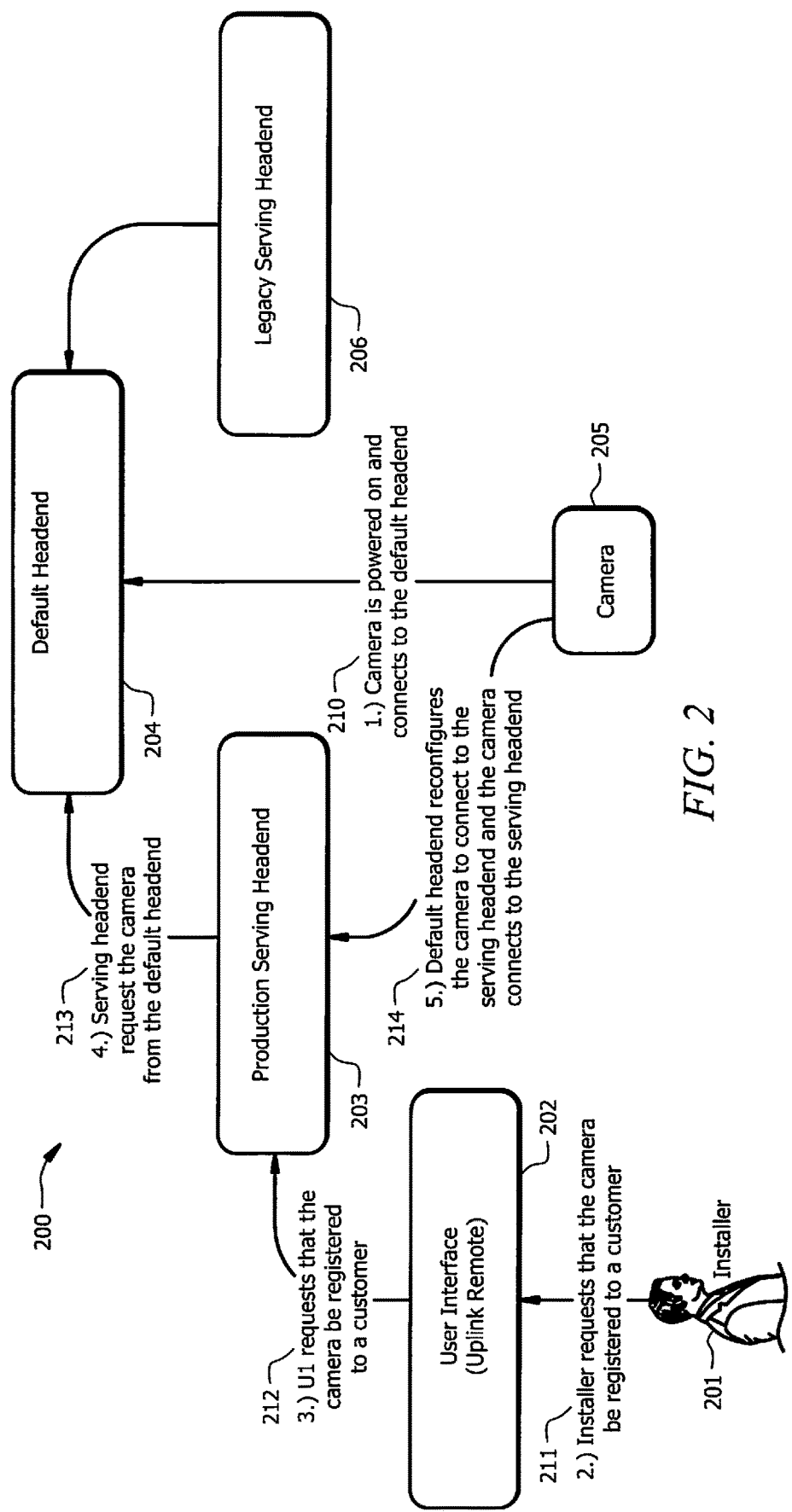
FIG. 2 is a flow chart of a preferred embodiment a system and method for registering cameras with a headend.

FIG. 2 is a flowchart of an embodiment of a method for registering a camera to a customer according to the concepts described herein. In the first step 210, the camera may be powered on. The camera 205 may automatically search for a network connection and attempt to contact the default headend, or installer 201 may use the remote interface 202 of the camera to begin the registration process. Upon powering up or at the command of the installer, the camera 205 may automatically connect to a default headend 204. The default headend location or address may be programmed into the camera by the manufacturer or other distributor or it may be entered by installer 201 using the user interface 202. At the second step 211, an installer may interact with a user interface (UI) to request that the camera be registered to a customer. The user interface may be present on a computer or other electronic device configured to receive inputs related to the customer and/or the camera.

At the third step 212, the UI 202 may send the request to a serving headend 203 that will receive data from the camera. The request may include information that is used to associate the camera with a customer in a database stored at the serving headend. Upon receiving the request from the UI, the serving headend 203 may request the camera from the default headend 204, as shown by the fourth step 213. The default headend 204 may communicate with the camera 205 and reassign the camera to the serving headend 203 upon receiving the request from the serving headend. The camera may be reassigned by modifying an attribute stored at the camera, as shown by fifth step 214. The camera may then begin communication with the serving headend. Legacy serving headends 206 may communicate with the default headend 204 if the camera 205 unregisters from the serving headend. The default headend 204 may then restore the camera to default settings or wait for the camera to begin a new registration process. In some embodiments, the identity of either the default or serving headend can be stored in the same configuration attribute in the camera as either an IP address or a DNS domain name.

Figure 3:
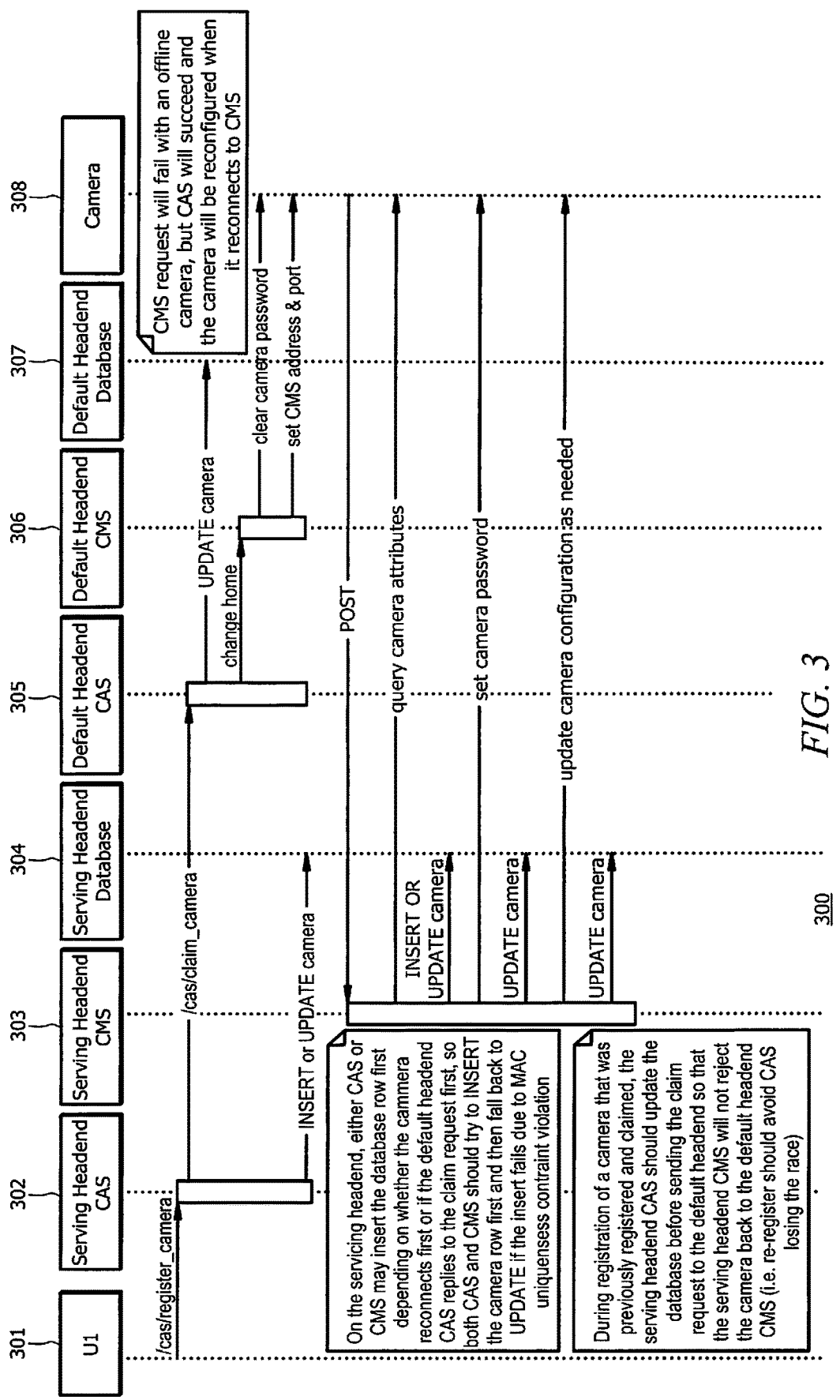
FIG. 3 is a message flow diagram showing a preferred embodiment of a messaging flow for camera registration according to the concepts described herein.

FIG. 3 is a message flow diagram of a preferred embodiment of camera registration process 300. The flow begins when a UI 301 sends a registration request to the serving headend CAS (Camera Administration System) 302. The registration request may be stored at the path /cas/register_camera in a server or other data storage device. A technician may enter the registration request at a UI on a mobile computing device capable of receiving inputs related to the camera and the customer that the camera will be associated with. The serving headend CAS 302 may attempt to insert camera data from the registration request into the serving headend database 304. If the insert fails because of MAC uniqueness (i.e. the camera's MAC is already present in the database), the serving headend CAS 302 may then perform an update command to update information associated with the camera in the serving headend database 304. After the serving headend CAS 302 receives the registration request from the UI, the serving headend CAS 302 may then claim the camera from the default headend CAS 305 via a message stored at or transmitted to the path /cas/claim_camera.

A claim request may contain several parameters, for example, a camera_id parameter, a cms_server parameter, and a shared secret parameter. The camera_id parameter may be an identifier used to uniquely identify a particular camera. The camera_id parameter may be all or a portion of a camera's MAC address, for example, the last six hexadecimal digits of the MAC address. The cms_server parameter may be an identifier for the serving headend. The cms_server parameter may be a fully qualified domain name of the serving headend's camera manager. The cms_server parameter may serve as a username for the serving headend's camera manager. The shared_secret parameter may be a shared secret between the default headend and the serving headend. The shared_secret parameter may serve as a password that the serving headend uses to authenticate with the default headend.

Upon receiving the claim message from the serving headend CAS 302, the default headend CAS 305 may then update the default headend database 307 with data from the claim request. The data may include information about the customer, the camera, and the serving headend. The default headend CAS 305 may also send a 'change home' message to the default headend CMS (Camera Management System) 306. The default headend CMS 306 may then send a message to the camera 308, causing the camera to clear its password if one is assigned (or alternatively, causing the camera to set its password to one known to the serving headend). The default headend CMS 306 may also send a message to the camera setting the CMS address and port on the camera to the serving headend. The camera may then be able to communicate with the serving headend rather than the default headend.

The camera 308 may acknowledge the claim request by transmitting a POST message via HTTPS to the serving headend CMS 303. While POST is described herein, any type of communication protocol suitable for transmitting the required data may be used. Upon receiving the POST message from the camera 308, the serving headend CMS 303 may query the camera attributes. Camera attributes may include identifiers, for example, media access control (MAC) address, etc. Camera attributes may also include capabilities of the camera, for example, transmission capabilities and image types. The serving headend CMS 303 may attempt to insert the camera data into the serving headend database. If the insert fails because of MAC uniqueness (i.e. the camera's MAC is already present in the database), the serving headend CMS 303 may then perform an update command to update information associated with the camera in the serving headend database 304. The serving headend CMS 303 may also send a message to set the camera password. The updated password may also be written to the serving headend database 304 by updating the camera's entry in the serving headend database. Finally, the serving headend CMS 303 may update the camera configuration as needed, for example, firmware updates may be transmitted to the camera. Updates and other configuration information that are applied to the camera may be documented in the serving headend database by updating the camera's entry in the serving headend database.

In some cases, the default headend CAS 305 may reply to the serving headend before the camera connects to the serving headend CMS 303. Therefore, both the serving headend CAS 302 and the serving headend CMS 303 should try first to insert the camera into the database. If the insert fails, an update operation should be performed. In some cases, a camera that has previously been registered and claimed may be re-registered. In these cases, the serving headend CAS 302 may update the serving headend database 304 before sending a claim request to the default headend so that in a race condition, the serving headend CMS 303 will not reject the camera back to the default headend CMS 306.

Figure 4:
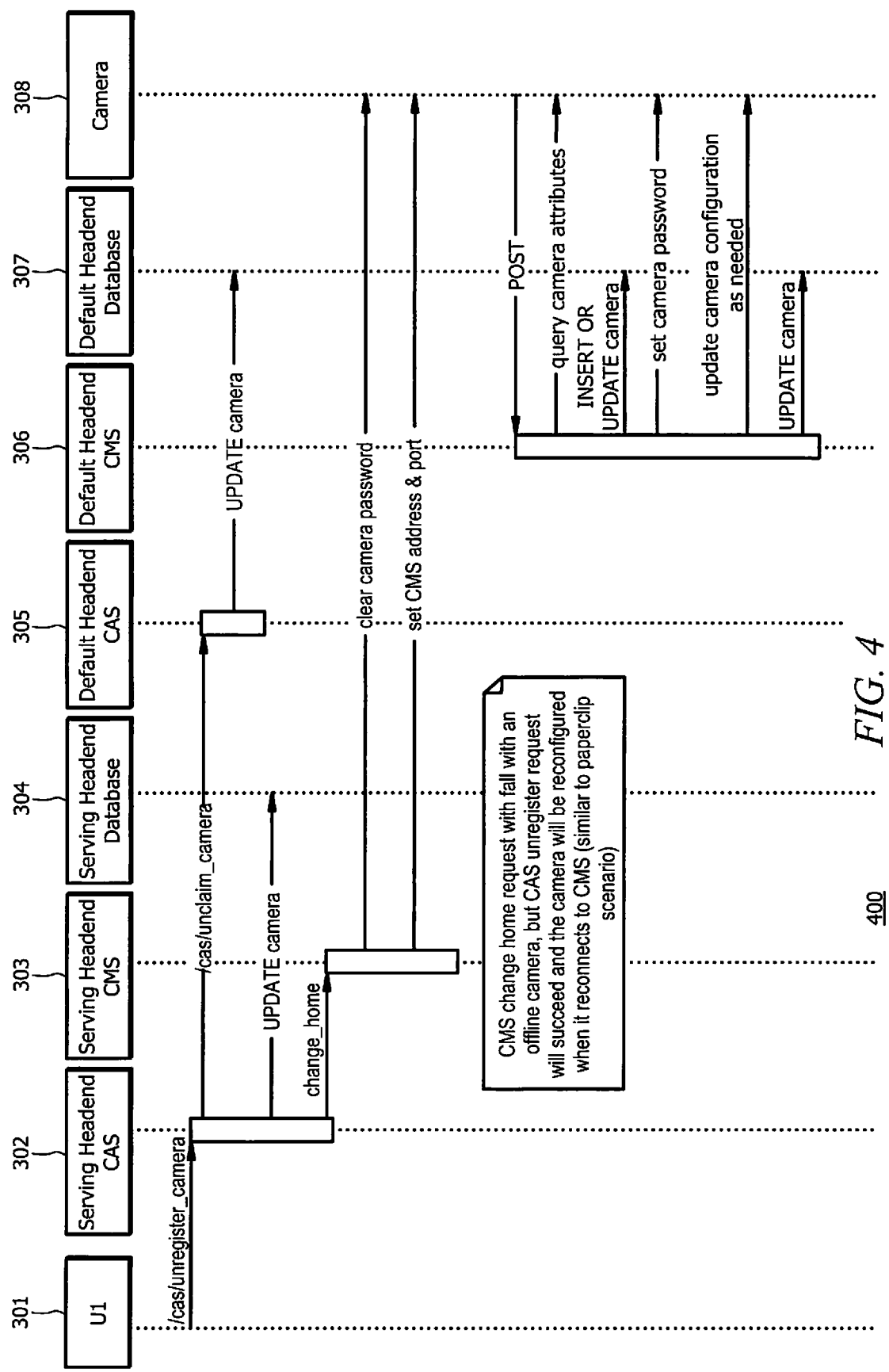
FIG. 4 is a message flow diagram showing a preferred embodiment of a messaging flow for camera unregistration according to the concepts described herein.

FIG. 4 is a message flow diagram of an embodiment of camera unregistration process 400. In some cases, a customer may unregister a camera 308 from their network. A technician may enter an unregistration request at a UI 301 on a mobile computing device capable of receiving inputs related to the camera and the customer. The UI may send an unregister message to the serving headend CAS 302. The unregister message may be stored at the path /cas/unregister camera in a server or other data storage device. Upon receiving the unregister message, the serving headend CAS 302 may send an unclaim message to the default headend CAS 305. The unclaim message may release the serving headend's claim of the camera. By releasing the claim, the next time the camera connects to the default headend, the default headend will not automatically reassign the camera to the serving headend. The default headend CAS 305 may update the camera's entry in the default headend database 307 based on the unclaim request.

An unclaim request may contain several parameters, for example, a mac parameter, a ems server parameter, and a shared_secret parameter. The mac parameter may be an identifier used to uniquely identify a particular camera. The mac parameter may be all or a portion of a camera's MAC address, for example, the last six hexadecimal digits of the MAC address. The cms_server parameter may be an identifier for the serving headend. The cms_server parameter may be a fully qualified domain name of the serving headend's camera manager. The cms_server parameter may serve as a username for the serving headend's camera manager. The shared_secret parameter may be a shared secret between the default headend and the serving headend. The shared_secret parameter may serve as a password that the serving headend uses to authenticate with the default headend.

The serving headend CAS 302 may also update the serving headend database 304 to unregister the camera from the serving headend. The serving headend CAS 302 may also send a change_home message to the serving headend CMS 303. Based on the change_home message, the serving headend CMS 303 may send a message to the camera 308, causing the camera to reset its password. The serving headend CMS 303 may also send a message to the camera 308, setting the CMS address and port at the camera to that of the default headend. The default headend CMS 306 may receive a POST message from the camera via HTTPS. While POST is described herein, any type of communication protocol suitable for transmitting the required data may be used. Upon receiving the POST message from the camera, the default headend CMS 306 may query the camera attributes. Camera attributes may include identifiers, for example, media access control (MAC) address, etc. Camera attributes may also include capabilities of the camera, for example, transmission capabilities and image types.

The default headend CMS 306 may attempt to insert the camera data into the default headend database 307. If the insert fails because of MAC uniqueness (i.e. the camera's MAC is already present in the database), the default headend CMS 306 may then perform an update command to update information associated with the camera in the default headend database 307. The default headend CMS 306 may also send a message to set the camera password. The updated password may also be written to the default headend database 307 by updating the camera's entry in the default headend database. Finally, the default headend CMS 306 may update the camera configuration as needed, for example, firmware updates may be transmitted to the camera 308. Updates and other configuration information that are applied to the camera may be documented in the default headend database by updating the camera's entry in the default headend database 307.

Figure 5:
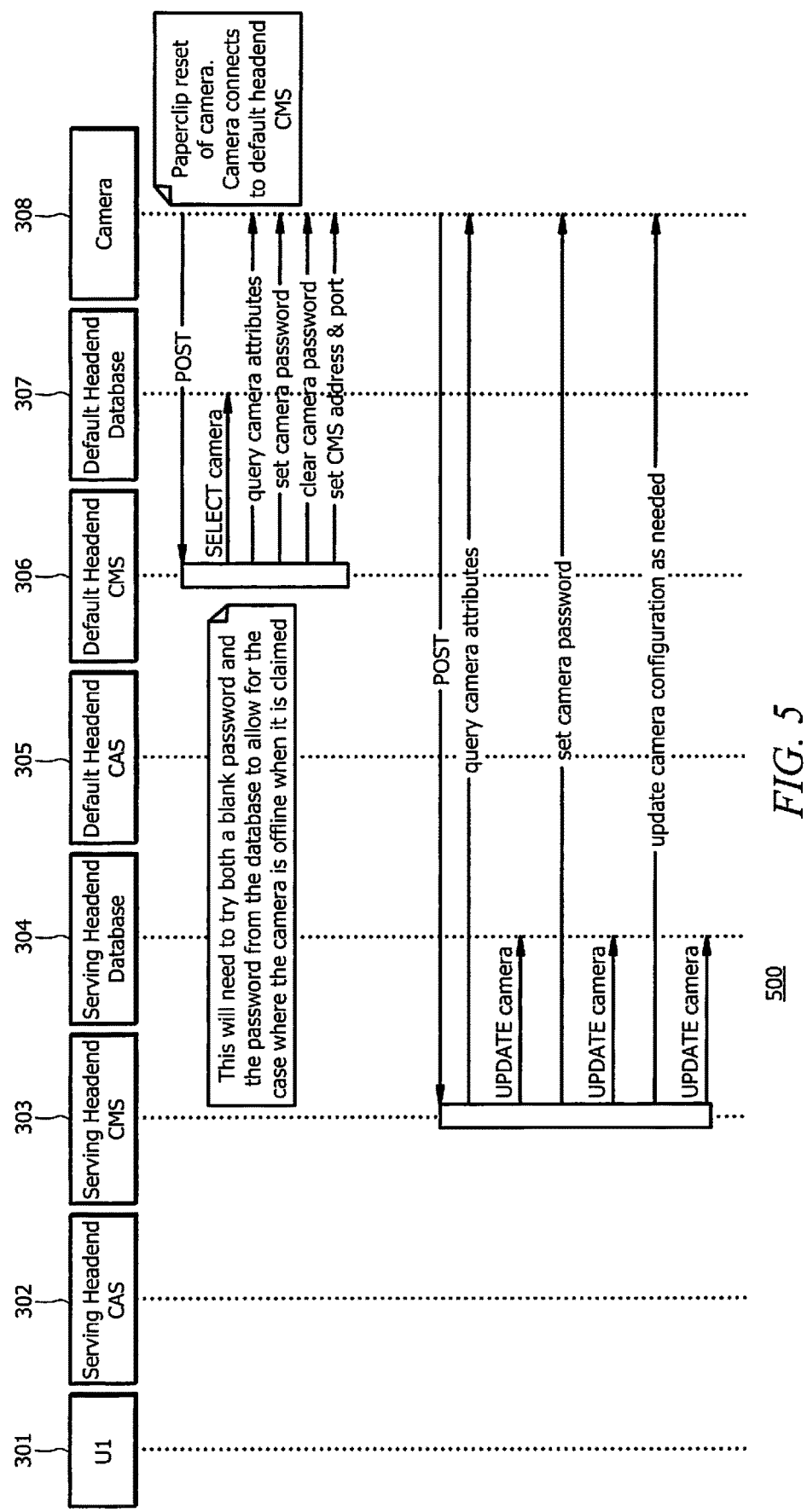
FIG. 5 is a message flow diagram showing a preferred embodiment of a messaging flow for camera following a firmware reset.

FIG. 5 is a message flow diagram of an embodiment of a camera connection following a firmware reset 500. In some cases a camera that has been registered with a serving headend may be reset to firmware defaults. A customer may depress a reset button on the camera, e.g. a paperclip reset; or a power outage or some other circumstance may lead to a camera resetting to the firmware defaults. In this case, the camera 308 may attempt to connect to the default headend CMS 306 upon powering up. The default headend CMS 306 may receive a POST message from the camera via HTTPS. While POST is described herein, any type of communication protocol suitable for transmitting the required data may be used. Upon receiving the POST message from the camera 308, the default headend CMS 306 may query the default headend database 307 for the camera. The query may be in the form of a SELECT command or other command used to retrieve data from a database. In addition, the default headend CMS 306 may query the camera 308 for camera attributes. Camera attributes may include identifiers, for example, media access control (MAC) address, etc. Camera attributes may also include capabilities of the camera, for example, transmission capabilities and image types. Upon querying the camera, the default headend CMS 306 may try a blank password (or one or more passwords from a set of passwords known to it) and/or a password retrieved from the default headend database 307 to access the camera. Upon accessing the camera, the default headend CMS 306 may set the camera password. Further, the default headend CMS 306 may cause the camera to set its password to one known to the serving headend (or clear the camera password) and set the CMS address and port settings on the camera to the address and port of the serving headend CMS 303.

The serving headend CMS 303 may be determined by the default headend CMS 306 based upon the results of the SELECT command used with the default headend database 307. Once the default headend CMS 306 has configured the camera 308 with the serving headend address, the camera may send a POST message to the serving headend CMS 303. Upon receiving the message from the camera 308, the serving headend CMS 303 may query the camera attributes. Based upon the results of the query, the serving headend CMS 30 may update the serving headend database 304. Next, the serving headend CMS 303 may update the password used to access the camera, upon updating the password, the serving headend CMS 303 may update the serving headend database 304 to reflect the updated password. Finally, the serving headend CMS 303 may update the camera configuration as needed, for example, firmware updates may be transmitted to the camera 308. Updates and other configuration information that are applied to the camera may be documented in the serving headend database 304 by updating the camera's entry in the serving headend database.

The message flow of process 500 may be used in several situations: 1) A paperclip reset of a registered camera. The camera may connect to the default headend after reset and may be redirected to the serving headend; 2) Camera may be claimed by and registered to a customer on the serving headend while the camera is not connected. When the camera comes back online it may connect to the default headend and may be redirected to the serving headend; 3) Camera may be unregistered and unclaimed while the camera is not connected. When the camera comes back online it may connect to its old serving headend and may be redirected to the default headend. In these cases, the CMS may not check for any of these cases until after it has ensured that the password configured on the camera matches the password in the database.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A remote security camera comprising:
    memory storing a camera management system address and a password, wherein the camera management system address and the password are an IP address for a default server and an authentication password associated with the default server, respectively;
    a network interface operable to establish a network connection upon the remote security camera being powered up, the network interface operable to send a message from the remote security camera to the default server using the IP address for the default server stored in the memory;
    a processor operable to:
        receive configuration information from the default server using the network interface in response to the default server receiving a claim request message from a customer server to claim the remote security camera from the default server and associating an identifier of the security camera with an IP address of the customer server in a default server database, wherein the configuration information comprises the IP address of the customer server and an authentication password associated with the customer server,
        responsive to receiving the configuration information, reset the camera management system address and the password stored in the memory to replace the IP address for the default server and the authentication password associated with the default server with the IP address of the customer server and the authentication password associated with the customer server, and
        receive a reconfiguration message from the customer server to unregister the remote security camera from the customer server, wherein the customer server transmits the reconfiguration message in response to receiving an unregister message from an installer device that is communicatively coupled with the customer server; and
        responsive to receiving the reconfiguration message,
            reset the camera management system address stored in the memory to replace the IP address of the customer server with the IP address for the default server to enable the remote security camera to point to the default server, and
            delete the authentication password associated with the customer server that is stored in the memory;
        transmit an acknowledgement message to the default server; and
        set the password of the remote security camera to another authentication password associated with the default server that is received in a password set message from the default sever.

2. The remote security camera of claim 1 wherein a user interface on the installer device sends a registration message to the customer server requesting the remote security camera to be registered to the customer server.

3. The remote security camera of claim 1 wherein the remote security camera is preprogrammed with the IP address of the default server.

4. The remote security camera of claim 1 wherein the default server is part of a registration service associated with a manufacturer of the remote security camera.

5. The remote security camera of claim 1 further comprising the default server database and a customer server database, wherein the default server database stores setup information for the camera before registration and after the camera is unregistered from the customer server and the customer server database stores information for the camera after registration.

* * * * *